United States Patent [19]

Gunmar et al.

[11] Patent Number: 5,507,007

[45] Date of Patent: Apr. 9, 1996

[54] METHOD OF DISTRIBUTING CAPACITY IN A RADIO CELL SYSTEM

[75] Inventors: Krister Gunmar; Ulf Tegth, both of Haninge, Sweden

[73] Assignee: Televerket, Farsta, Sweden

[21] Appl. No.: 315,493

[22] Filed: Sep. 30, 1994

Related U.S. Application Data

[63] Continuation of Ser. No. 952,795, Sep. 28, 1992, abandoned.

[30] Foreign Application Priority Data

Sep. 27, 1991 [SE] Sweden ................................ 9102810

[51] Int. Cl.$^6$ ............................................... H04M 11/00
[52] U.S. Cl. ........................... 455/33.1; 455/56.1; 455/62; 455/63; 455/67.1; 379/59
[58] Field of Search ................................ 455/33.1, 33.2, 455/53.1, 54.1, 56.1, 34.1, 34.2, 62, 63, 67.6, 67.1, 67.3, 226.1, 226.2, 226.3; 379/58, 59, 60, 63

[56] References Cited

U.S. PATENT DOCUMENTS

| | | | |
|---|---|---|---|
| 4,670,899 | 6/1987 | Brody et al. | 379/60 |
| 4,998,290 | 3/1991 | Olenick et al. | 455/53.1 |
| 5,134,709 | 7/1992 | Bi et al. | 455/33.1 |

Primary Examiner—Andrew I. Faile
Attorney, Agent, or Firm—Oblon, Spivak, McClelland, Maier & Neustadt

[57] ABSTRACT

The invention relates to a method of determining the distribution of marginal traffic capacity of given cells in a radio cell system comprising base stations with associated coverage areas and radio stations within the coverage areas of the cell. Compatibility calculations are performed for each element or a selective selection of elements of an exclusion matrix. The channels are redistributed in this way iteratively in dependence of the time dependent traffic need in each cell.

3 Claims, 14 Drawing Sheets

NUMBER OF CHANNELS: 18

| | | | | | | | | |
|---|---|---|---|---|---|---|---|---|
| 1.0  | 27 | 53 | 55 | 72 | 85 | 92 | 98 | |
| 21.0 |  3 |  9 | 20 | 31 | 49 | 65 | 100| |
| 2.0  | 44 | 46 | 51 | 79 | 82 | 89 | 97 | |
| 22.0 |  1 |  2 | 24 | 35 | 50 | 62 | 86 | |
| 3.0  |  4 | 23 | 28 | 42 | 47 | 81 | 87 | |
| 23.0 | 22 | 26 | 48 | 59 | 74 | 75 | 93 | |
| 4.0  | 40 | 52 | 58 | 60 | 88 | 90 | 91 | |
| 24.0 | 11 | 16 | 38 | 70 | 71 | 76 | 94 | |
| 5.0  |  7 | 12 | 21 | 45 | 57 | 69 | 95 | |
| 25.0 |  5 |  6 | 10 | 14 | 43 | 61 |    | |
| 6.0  | 15 | 36 | 66 | 73 | 83 | 84 |    | |
| 26.0 | 17 | 18 | 25 | 68 | 77 | 78 | 96 | |
| 7.0  | 32 | 34 | 41 | 56 | 64 | 99 |    | |
| 27.0 |  8 | 19 | 29 | 30 | 80 |    |    | |
| 8.0  | 33 | 67 |    |    |    |    |    | |
| 28.0 | 13 | 39 | 54 | 63 |    |    |    | |
| 9.0  |    |    |    |    |    |    |    | |
| 29.0 | 37 |    |    |    |    |    |    | |

*FIG. 1*

NUMBER OF CHANNELS: 18

| | | | | | | | | |
|---|---|---|---|---|---|---|---|---|
| 1.0  |  7 | 43 | 75 | 78 | 99 | 114| 123| 130|
| 21.0 |  5 | 18 | 32 | 48 | 69 | 89 | 97 | 132|
| 2.0  |  8 | 62 | 65 | 72 | 107| 111| 118| 128|
| 22.0 |  1 |  3 | 39 | 49 | 53 | 71 | 86 | 115|
| 3.0  | 10 | 37 | 44 | 60 | 66 | 109| 116| 129|
| 23.0 | 36 | 42 | 68 | 82 | 101| 102| 124|    |
| 4.0  | 58 | 73 | 81 | 84 | 117| 119| 121|    |
| 24.0 | 21 | 26 | 33 | 56 | 96 | 98 | 104| 125|
| 5.0  | 15 | 22 | 35 | 63 | 80 | 95 | 126|    |
| 25.0 | 11 | 13 | 19 | 24 | 61 | 85 | 103|    |
| 6.0  | 25 | 54 | 90 |100 | 112| 113|    |    |
| 26.0 | 28 | 30 | 41 | 92 | 106| 127|    |    |
| 7.0  | 29 | 50 | 52 | 59 | 76 | 79 | 88 |105 131|
| 27.0 | 17 | 31 | 34 | 46 | 47 | 108|    |    |
| 8.0  |  2 | 51 | 74 | 83 | 91 | 94 | 110| 122|
| 28.0 | 23 | 40 | 45 | 57 | 77 | 87 | 93 |    |
| 9.0  |  9 | 12 | 16 | 20 | 64 |    |    |    |
| 29.0 |  4 |  6 | 14 | 27 | 38 | 55 | 67 | 70 120|

EXCLUSIONS FOR STATION NO: 4.   A4   3.0000

EXCLUSIONS FOR STATION NO: 7.    5.0000    A7

EXCLUSIONS FOR STATION NO: 10.   25.0000   A10

| 8 | 19 | 34 | 38 | 40 | 47 | 52 | 58 | 76 | 77 | 78 | 81 | 83 | 85 | 88 | 94 |
|---|----|----|----|----|----|----|----|----|----|----|----|----|----|----|----|
| o | o  | o  | o  | o  | o  | o  | o  | o  | o  | o  | o  | o  | o  | o  | o  |
| o | o  | o  | o  | o  | o  | o  | o  | o  | o  | o  | o  | o  | o  | o  | o  |
| o | o  | o  | o  | o  | o  | o  | o  | o  | o  | o  | o  | o  | o  | o  | o  |
| o | o  | o  | o  | o  | o  | o  | o  | o  | o  | o  | o  | o  | o  | o  | o  |
| o | o  | o  | o  | o  | o  | o  | o  | o  | o  | o  | o  | o  | o  | o  | o  |
| o | o  | o  | o  | o  | o  | o  | o  | o  | o  | o  | o  | o  | o  | o  | o  |
| o | o  | o  | o  | o  | o  | o  | o  | o  | o  | o  | o  | o  | o  | o  | o  |
| o | o  |    |    |    |    |    | o  | o  | o  | o  | o  | o  | o  | o  | o  |

| 18 | 42 | 48 | 51 | 56 | 70 | 71 | 79 | 82 |
|----|----|----|----|----|----|----|----|----|
| o  | o  | o  | o  | o  | o  | o  | o  | o  |
| o  | o  | o  | o  | o  | o  | o  | o  | o  |
| o  | o  | o  | o  | o  | o  | o  | o  | o  |
| o  | o  | o  | o  | o  | o  | o  | o  | o  |
| o  | o  | o  | o  | o  | o  | o  | o  | o  |

ETC.

| | | | | | | | | |
|---|---|---|---|---|---|---|---|---|
| 1 | A1 | 20 | A10 | | | | | |
| | 22. | | 28. | | 9. | | | |
| 2 | A1 | 21 | A11 | | | | | |
| | 8. | | 4. | | 24. | | | |
| 3 | A2 | 22 | A12 | 39 | A24 | | 55 | A37 |
| | 22. | | 5. | | 22. | 3. | | 29. |
| 4 | A2 | 23 | A13 | 40 | A24 | | 56 | A38 |
| | 29. | | 28. | | 28. | 9. | | 24. |
| 5 | A3 | 24 | A14 | 41 | A25 | | 57 | A39 |
| | 21. | | 25. | | 26. | | | 28. |
| 6 | A3 | 25 | A15 | 42 | A26 | | 58 | A40 |
| | 29. | | 6. | | 23. | | | 4. |
| 7 | A4 | 26 | A16 | 43 | A27 | | 59 | A41 |
| | 1. | | 4. | 24. | 1. | | | 7. |
| 8 | A4 | 27 | A16 | 44 | A28 | | 60 | A42 |
| | 2. | | 29. | | 3. | | | 3. |
| 9 | A4 | 28 | A17 | 45 | A28 | | 61 | A43 |
| | 28. | | 8. | | 28. | | | 25. |
| 10 | A4 | 29 | A17 | 46 | A29 | | 62 | A44 |
| | 3. | | 27. | 3. | 27. | | | 2. |
| 11 | A5 | 30 | A18 | 47 | A30 | | | |
| | 25. | | 26. | | 27. | | | |
| 12 | A5 | 31 | A19 | 48 | A31 | | | |
| | 9. | | 27. | | 21. | | | |
| 13 | A6 | 32 | A20 | 49 | A31 | | | |
| | 25. | | 1. | 21. | 22. | | | |
| 14 | A6 | 33 | A20 | 50 | A32 | | | |
| | 29. | | 24. | | 7. | | | |
| 15 | A7 | 34 | A20 | 51 | A33 | | | |
| | 5. | | 27. | 8. | 8. | | | |
| 16 | A7 | 35 | A21 | 52 | A34 | | | |
| | 9. | | 5. | | 7. | | | |
| 17 | A8 | 36 | A22 | 53 | A35 | | | |
| | 27. | | 23. | | 22. | | | |
| 18 | A9 | 37 | A23 | 54 | A36 | | | |
| | 21. | | 3. | 23. | 6. | | | |
| 19 | A10 | 38 | A23 | | | | | |
| | 25. | | 29. | | | | | |

*FIG. 4*

| | | | | | |
|---|---|---|---|---|---|
| A1 | 2 | A34 | 1 | A67 | 1 |
| A2 | 2 | A35 | 1 | A68 | 3 |
| A3 | 2 | A36 | 1 | A69 | 1 |
| A4 | 4 | A37 | 1 | A70 | 2 |
| A5 | 2 | A38 | 1 | A71 | 1 |
| A6 | 2 | A39 | 1 | A72 | 1 |
| A7 | 2 | A40 | 1 | A73 | 1 |
| A8 | 1 | A41 | 1 | A74 | 1 |
| A9 | 1 | A42 | 1 | A75 | 2 |
| A10 | 2 | A43 | 1 | A76 | 1 |
| A11 | 1 | A44 | 1 | A77 | 1 |
| A12 | 1 | A45 | 2 | A78 | 1 |
| A13 | 1 | A46 | 1 | A79 | 1 |
| A14 | 1 | A47 | 2 | A80 | 1 |
| A15 | 1 | A48 | 1 | A81 | 2 |
| A16 | 2 | A49 | 2 | A82 | 1 |
| A17 | 2 | A50 | 1 | A83 | 1 |
| A18 | 1 | A51 | 1 | A84 | 1 |
| A19 | 1 | A52 | 2 | A85 | 1 |
| A20 | 3 | A53 | 2 | A86 | 1 |
| A21 | 1 | A54 | 1 | A87 | 1 |
| A22 | 1 | A55 | 1 | A88 | 1 |
| A23 | 2 | A56 | 1 | A89 | 1 |
| A24 | 2 | A57 | 1 | A90 | 2 |
| A25 | 1 | A58 | 1 | A91 | 2 |
| A26 | 1 | A59 | 2 | A92 | 1 |
| A27 | 1 | A60 | 1 | A93 | 1 |
| A28 | 2 | A61 | 1 | A94 | 1 |
| A29 | 1 | A62 | 1 | A95 | 1 |
| A30 | 1 | A63 | 1 | A96 | 1 |
| A31 | 2 | A64 | 1 | A97 | 2 |
| A32 | 1 | A65 | 1 | A98 | 1 |
| A33 | 1 | A66 | 1 | A99 | 1 |
| | | | | A100 | 1 |

METHOD OF DISTRIBUTING CAPACITY IN A RADIO CELL SYSTEM

This application is a continuation of application Ser. No. 07/952,795, filed on Sep. 28, 1992, now abandoned.

FIELD OF THE INVENTION

The present invention is applicable to radio systems comprising base stations and associated substations in the case where a channel plan is given for all cells of the system. The term cell refers to the solid angle irradiated by a specific antenna system and providing coverage according to given coverage limit values. Thus, a base station can sustain a plurality of cells having various antenna diagrams, bearings and effective transmitted power. The invention is used in radio cell systems in which a control unit for channel allocation is provided in each cell. According to the invention a method of indicating, in dependence of the traffic need and a primary given channel plan, at which cells in an existing mobile radio system it is possible to change the capacity by adding more channels per cell at the same time as the number of channels per cell is reduced in other cells.

STATE OF THE ART

The mobile radio systems in various countries are growing rapidly, especially in large urban areas, and new methods are developed to achieve traffic handling with an efficient utilization of radio frequency aspects. In many places of the world computer programs are beginning to be used to perform channel allocation. These programs utilize information about which cells that can not share a channel with, or have a neighbouring channel with, any other cell, said information being described by a so-called exclusion matrix. The solutions obtained so far represent stationary solutions in which the channels once and for all are fixed for fixed base stations or cells. However, there is a need to redistribute the channels for different cells in dependence of the traffic need in the course of the day. The method proposed by the invention is useful if an exlusion matrix for every cell in the radio system is available and a channel plan of the cells in the system. The channel plan satisfies a stationary partial need of capacity in the system. The method results in the possibility of redistributing the capacity in the various cells of the mobile radio system.

SUMMARY OF THE INVENTION

Thus, the present invention provides a method of determining the distribution of marginal traffic capacity for given cells in a radio cell system comprising a number of base stations with cells and associated coverage areas, and radio stations within the coverage areas of the cells. The characterizing feature of the invention is that compatibilty calculations are performed for each element or a selective selection of elements of an exclusion matrix with respect to all or a selective selection of channels in a given channel allocation in such a manner that a list can be generated for alternative channels for each cell within the base stations. Thereafter, a distribution of maximal traffic capacity for the cell in terms of the number of realizable channels per cell is calculated by selecting cells with alternative, not mutually excluding possible channels in accordance with a given order of priority, by examining alternative possible channels according to the list in a further order of priority, and by adding one of the possible channels to the cell, resulting in a new channel plan and exclusion matrix, which creates the basis of a new list. This procedure is iterated until no alternative channel for the cell can be found in the list and hence no further channel for the cell can be added, or the remaining cells are uninteresting in view of their low priority according to a given order of priority. Similarly, channels may be subtracted in low priority cells and thus, their capacity is decreased. The orders of priority are naturally dependent of the current traffic situation in the system. In means provided centrally, for instance a computer, the allocation of the required number of channels per cell can be made dependent of the traffic need in every moment, which is assumed to be known and recorded and continuously updated in a memory unit provided centrally, and the above control unit in each cell in question obtains information continuously about the momentary valid channel plan in order to enable connection of the for the moment best, in view of the traffic demand, possible channels.

DETAILED DESCRIPTION OF PREFERRED EMBODIMENTS

Figure 1:
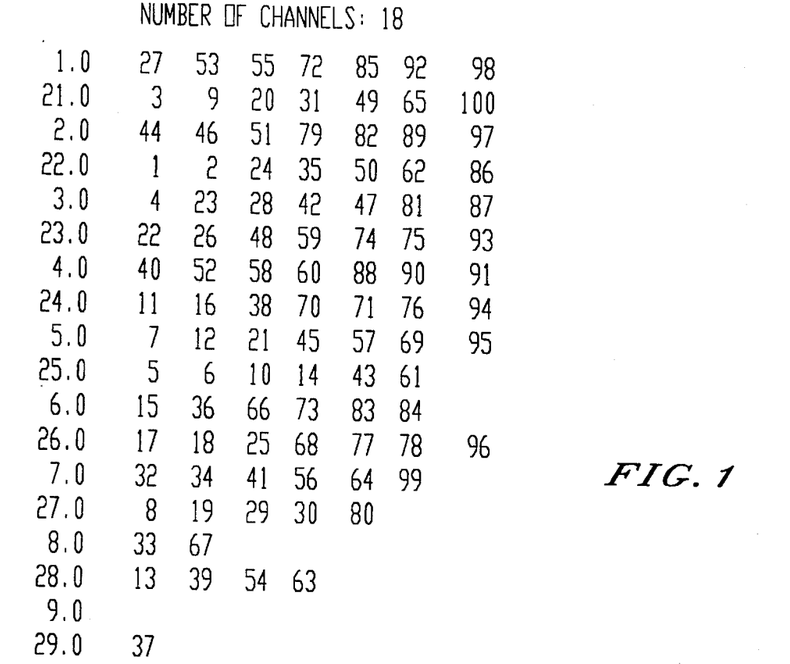
FIG. 1 is a table that shows an example of a channel allocation.
Figure 3:
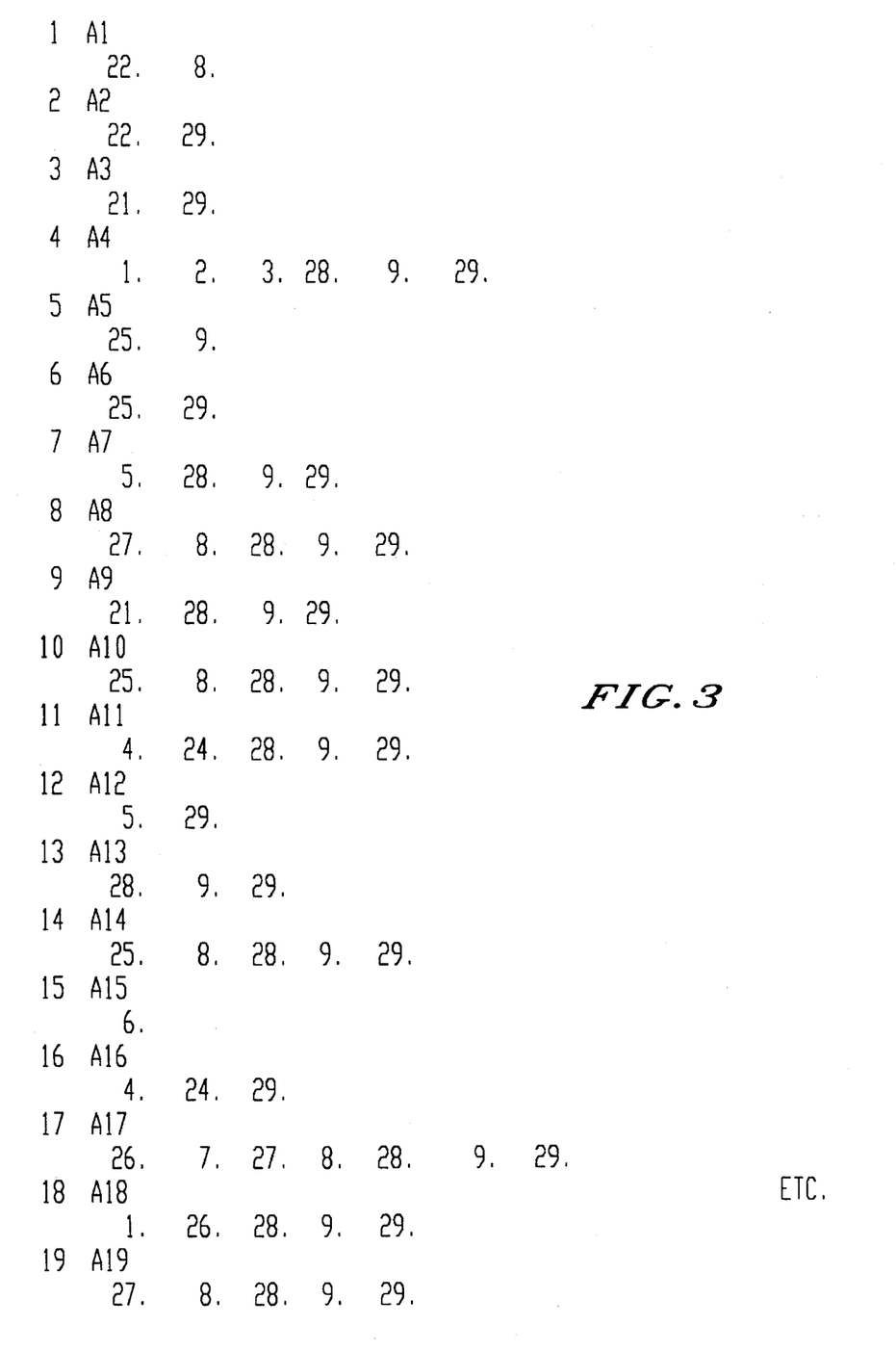
FIG. 3 is a table that shows marginal capacity with respect to the channel plan of FIG. 1 and the exclusion matrix of FIG. 2.
Figure 8A:
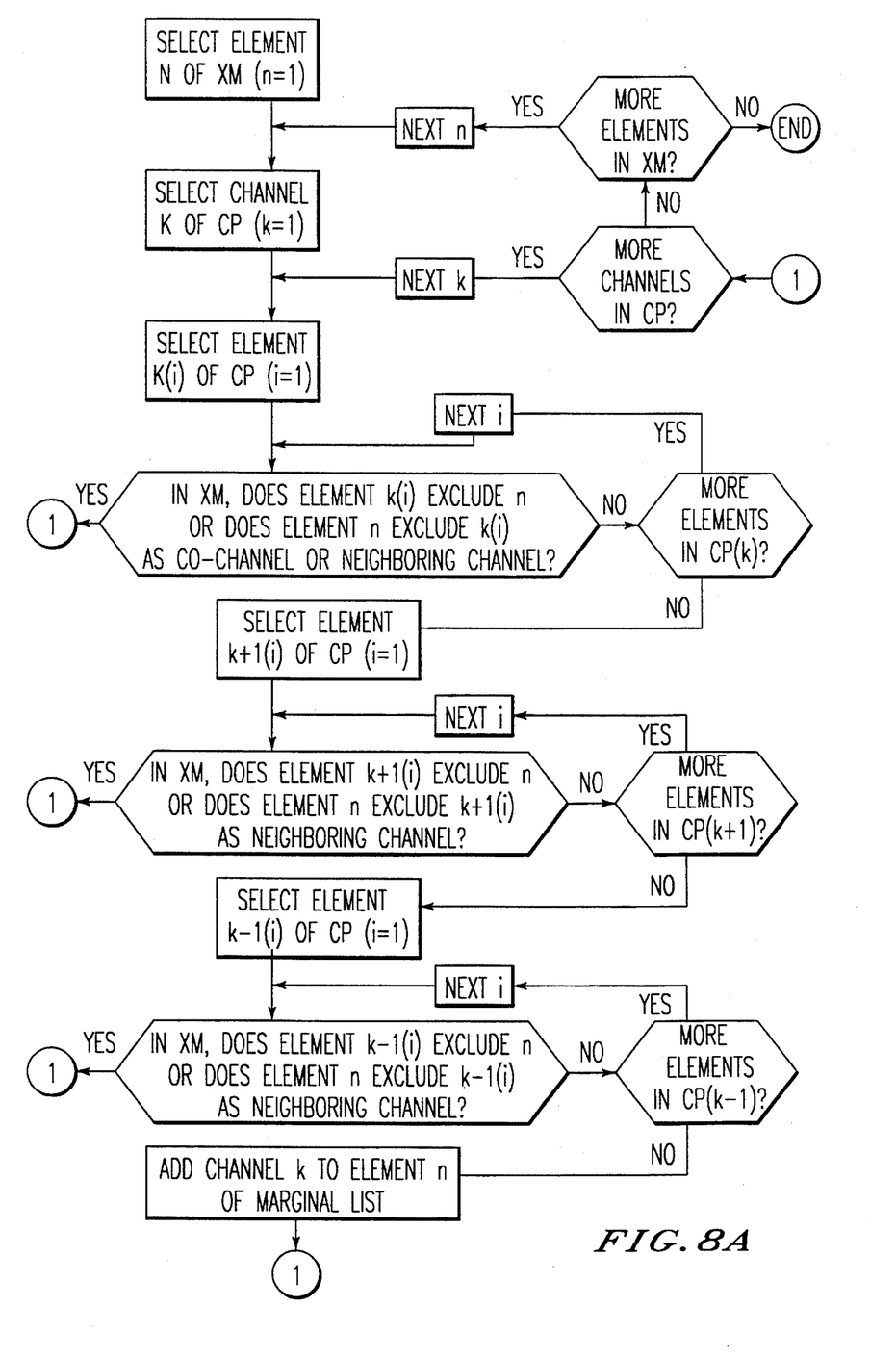
FIG. 8a and 8b are flow charts according to this invention.
Figure 8B:
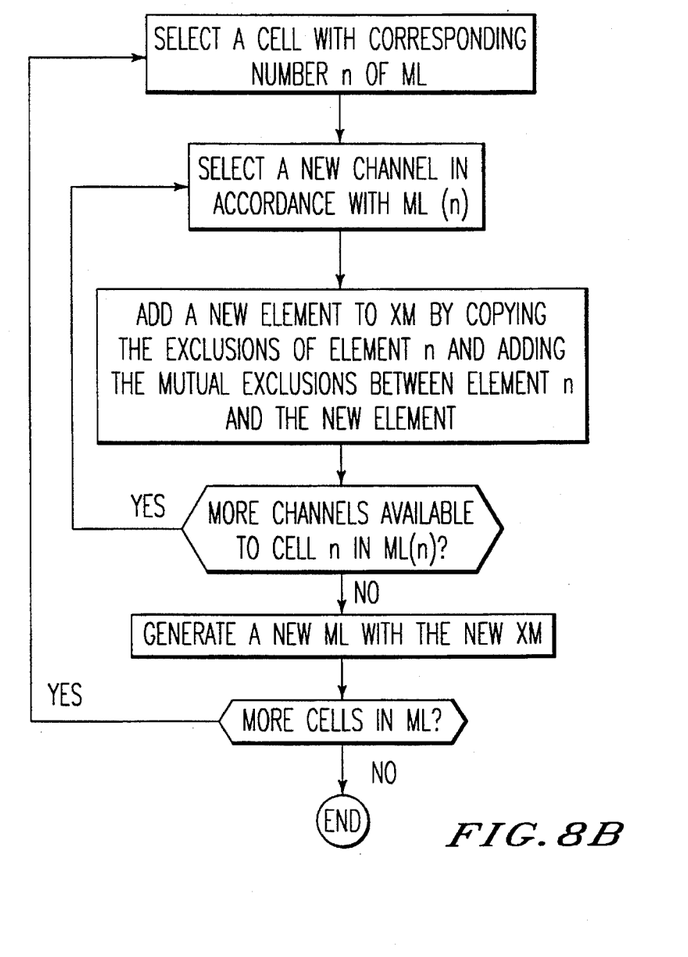

The following description is based on a realization with a specific example having a degree of complexity comparable with that of NMT 900 in the Stockholm area. In table 1 is shown a channel allocation in the form of a list having lines of element numbers and, at the left, associated channels having the designations 1, 21, 2, 22, etc. As noted, the table shown in FIG. 1, is a "channel plan" where the left column is the frequency of channels for example, 1, 21, 2, 22, etc., with Channels 1 and 21, 21 and 22 being, for example, neighboring channels (i.e., they use an adjacent frequency). Each of the individual lines represent a cell allocated to the respective frequencies (i.e., cell numbers 27, 53, and 55 etc. use the frequency 1 and cell numbers 3, 9, and 20 etc. use the frequency 21, etc). The reason for the designations 1, 21, 2, 22, etc. is that the channel allocation relates to a mobile radio system having so-called interleaved channels. Obviously succeeding channels are neighbouring channels, for instance 21 and 2. For each channel it is possible to read out what elements are to be assigned to this channel, for instance the elements 27, 53, 55, etc. are to be assigned to channel 1. What cells these element numbers relate to can be read from the exclusion matrix, see table 2. The number of elements in the cell equals the number of channels allocated to the cell and thus, is an expression of the capacity that may be handled by the cell. In the exclusion matrix of table 2, however, it happens to be only one channel per cell. A prerequisite of enabling allocation of allocating the same channel to different elements is that the exclusion matrix does not contain cochannel exclusions between these elements. Cochannels exclusion and neighbouring channel exclusion are represented by two element number series included in each element. These two number series indicate the elements that are excluded to have a channel being cochannel and neighbouring channel or cochannel, respectively, to the element under study. Thus, if we consider the elements to which channel 21 is allocated and the corresponding elements of the exclusion matrix it may be seen that these elements do not have any mutual cochannel exclusions or neighbouring channel exclusions,,and neither any neighbouring channel exclusions with respect to the elements allocated the channels 1, 2. The invention is exemplified by the following procedure:

The flow charts 8a and 8b depict the following steps:

1. Select element number 1 of the exclusion matrix. Can channel number 1 be allocated to this element? The question is answered by calculating from the exclusion matrix all cochannel exclusions and neighbouring channel exclusions generated by elements,having the numbers 27, 53, 55, etc., and all neighbouring channel exclusions generated by the elements having the numbers 3, 9, 20, etc. If among these exclusions number 1 is not found as cochannel exclusion or as neighbouring channel exclusion, and if the elements 27, 53, etc. are not found as cochannel or neighbouring channel exclusions among the exclusions of element 1 of the exclusion matrix, and if the elements 3, 9, etc. are not found as neighbouring channels of an exclusion of the element 1 of the exclusion matrix, channel 1 can be allocated to element 1. The fact that element 1 can be on channel 1 is entered in a list comprising element numbers, cell numbers and possible channel candidates compatible with the channel. We call this list marginal list, see table 3. FIG. 3 in the table contained therein relates to a marginal list obtained by generating a marginal list according to the flow chart 8a using the channel plan of Table 1 and the exclusion matrix of Table 2 (for example the first element says that station A1 can use the channels 22 and 8 that is the station may be extended with channel 8 since the channel 22 is the original channel according to the channel plan).

2. Select again element number 1 of the exclusion matrix. Can channel 21 be allocated to this element? To obtain an answer to this question the above procedure is repeated The calculations will be more comprehensive this time, since channel 21 as opposed to channel 1 has two neighbouring channels, and channel exclusions for every element thereof must be retrieved from the exclusion matrix. Furthermore, the neighbouring channel exclusions of element number 1 have to be checked against the elements of the channels 1, 21 and 2. In case channel 21 can be allocated to element 21 this is entered in the channel list.

3. The above procedure is repeated until it has been verified if channels 21, 2, 22, 3, etc., through the last channel 29 can be allocated to element 1 and if it is possible to allocate the respective channel an entry is made in the marginal list.

4. The above procedure with the steps 1–3 is repeated until every element of the matrix has been examined and thereby also every cell.

Figure 2A:
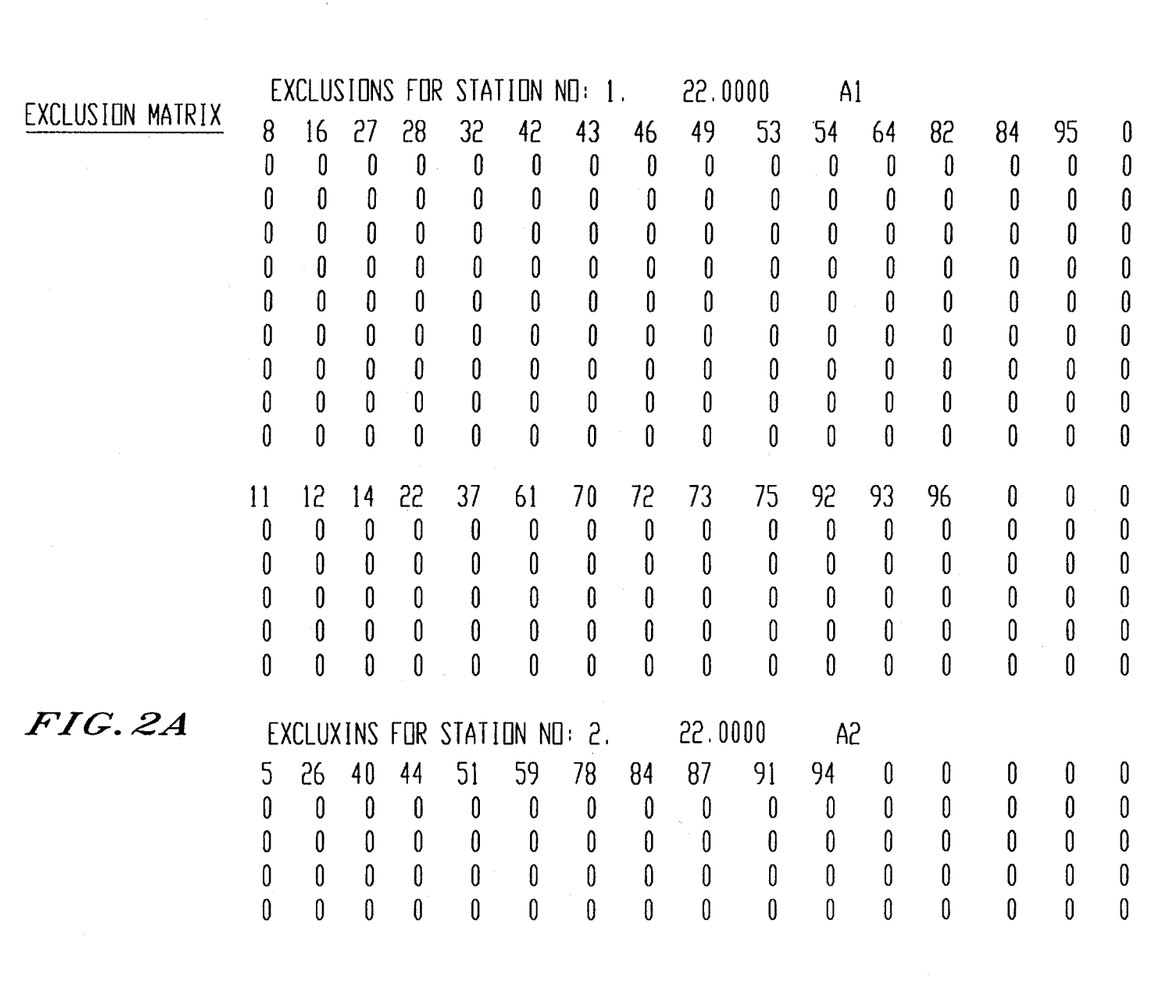
FIGS. 2A–2H are a table that shows an exclusion matrix having as many elements as the number of cells.
Figure 2B:
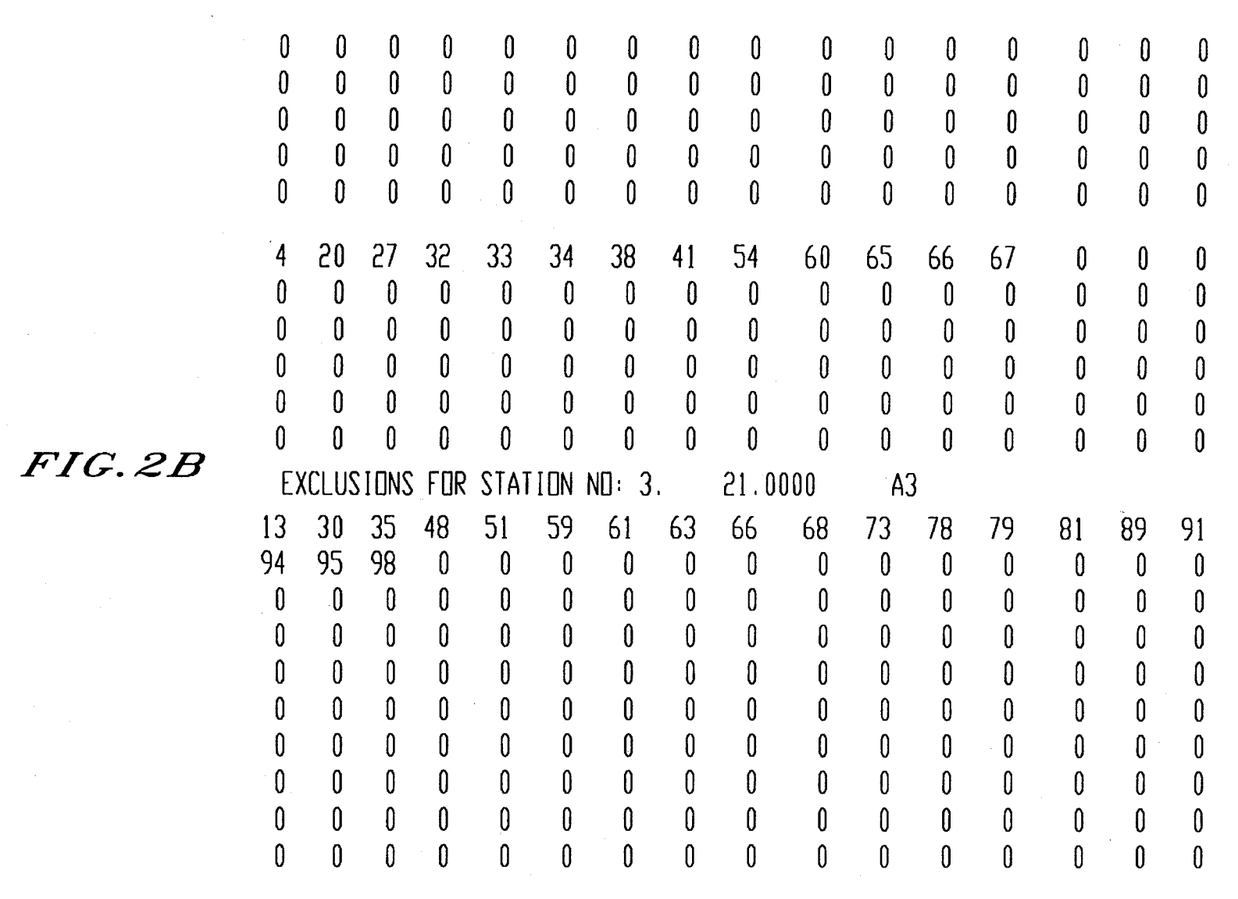
Figure 2C:
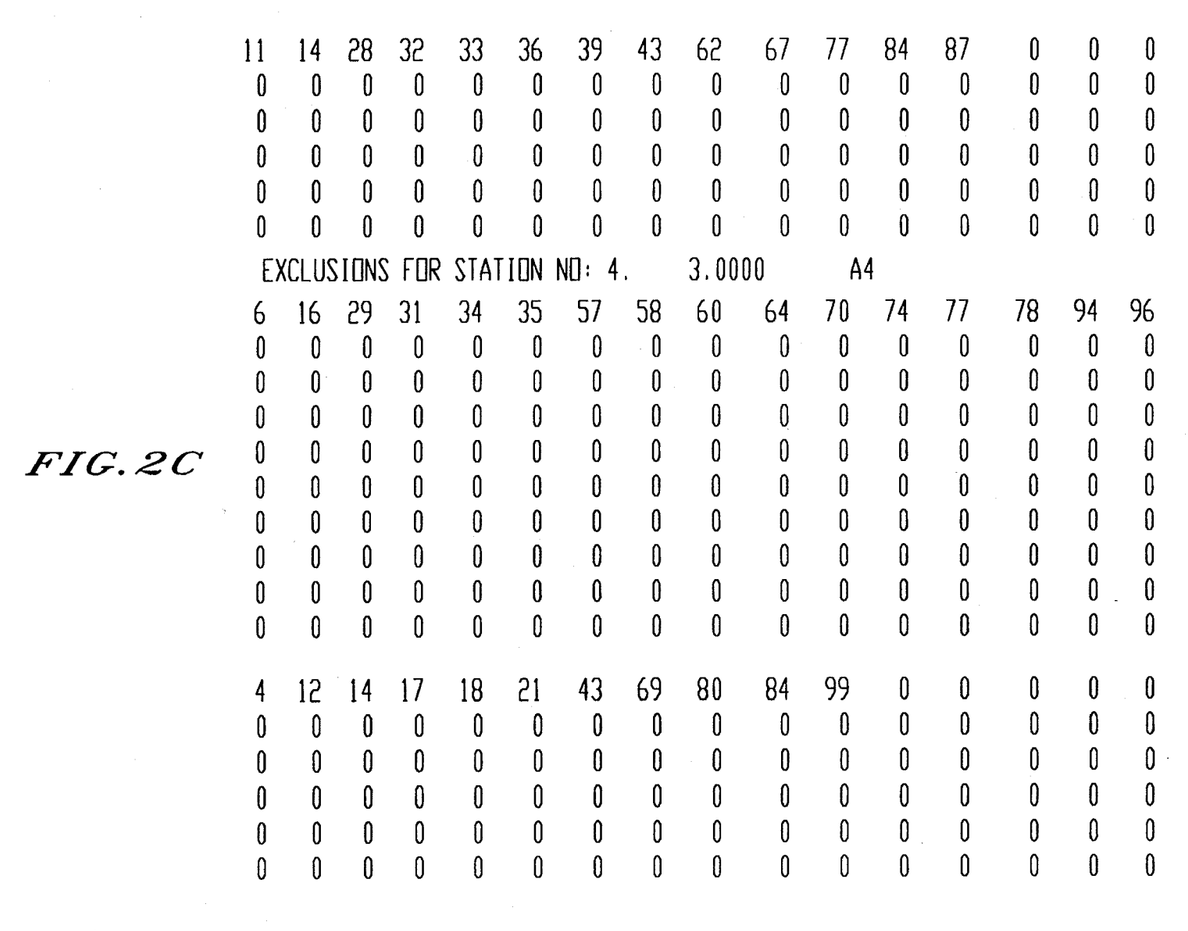
Figure 2D:
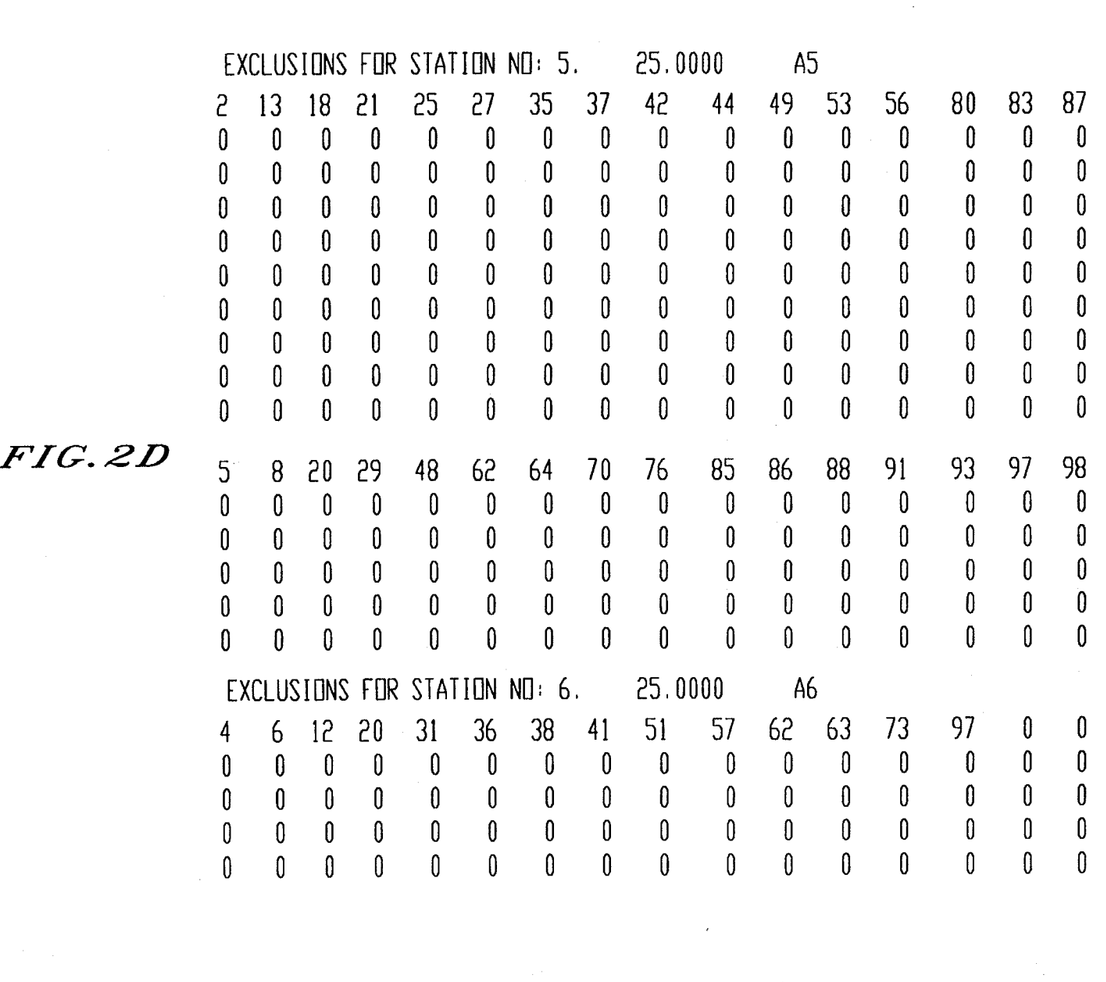
Figure 2E:
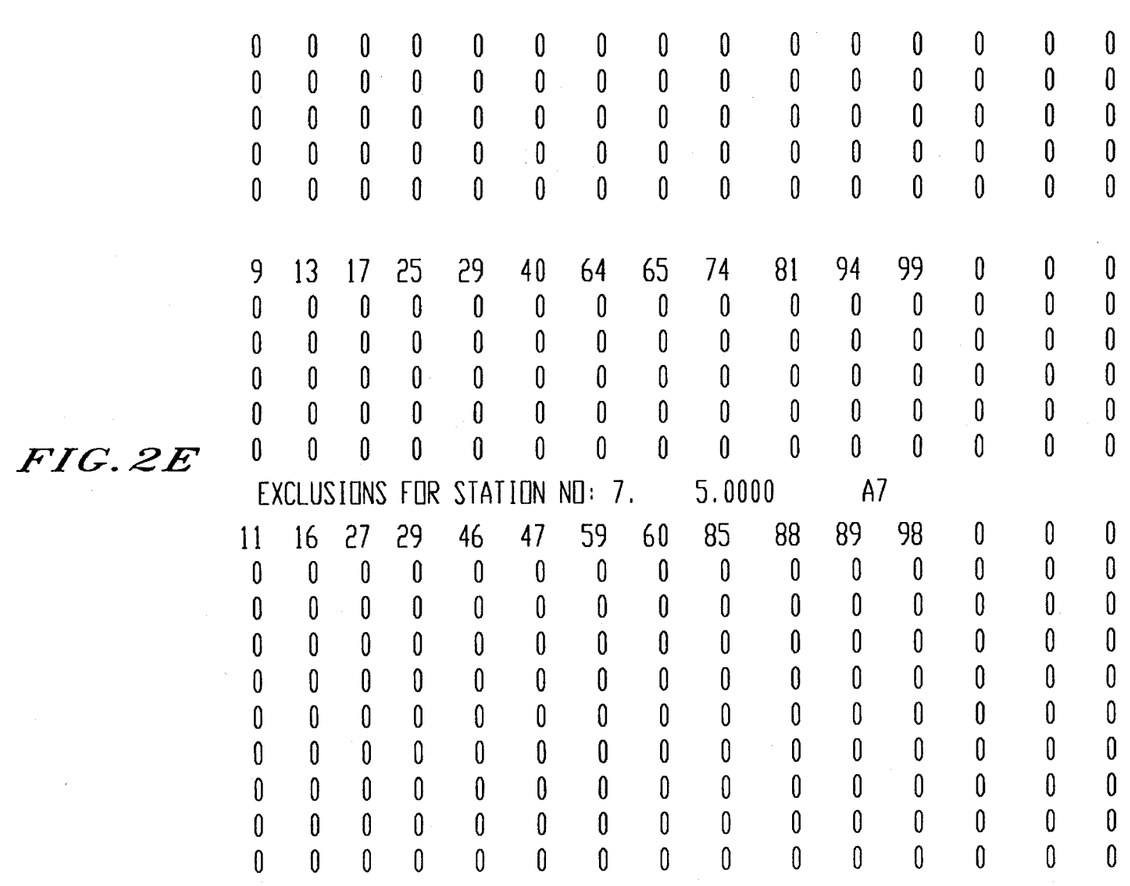
Figure 2F:
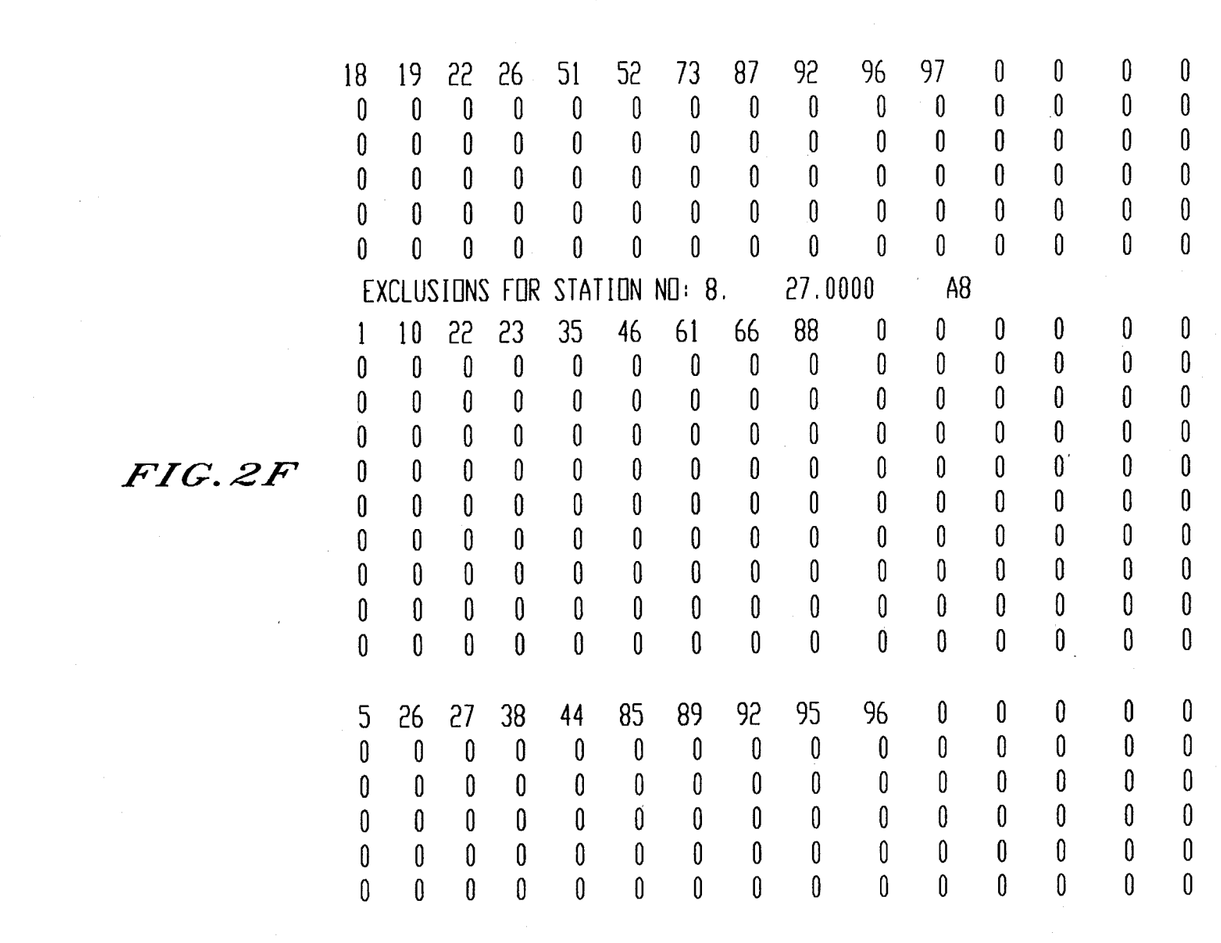
Figure 2G:
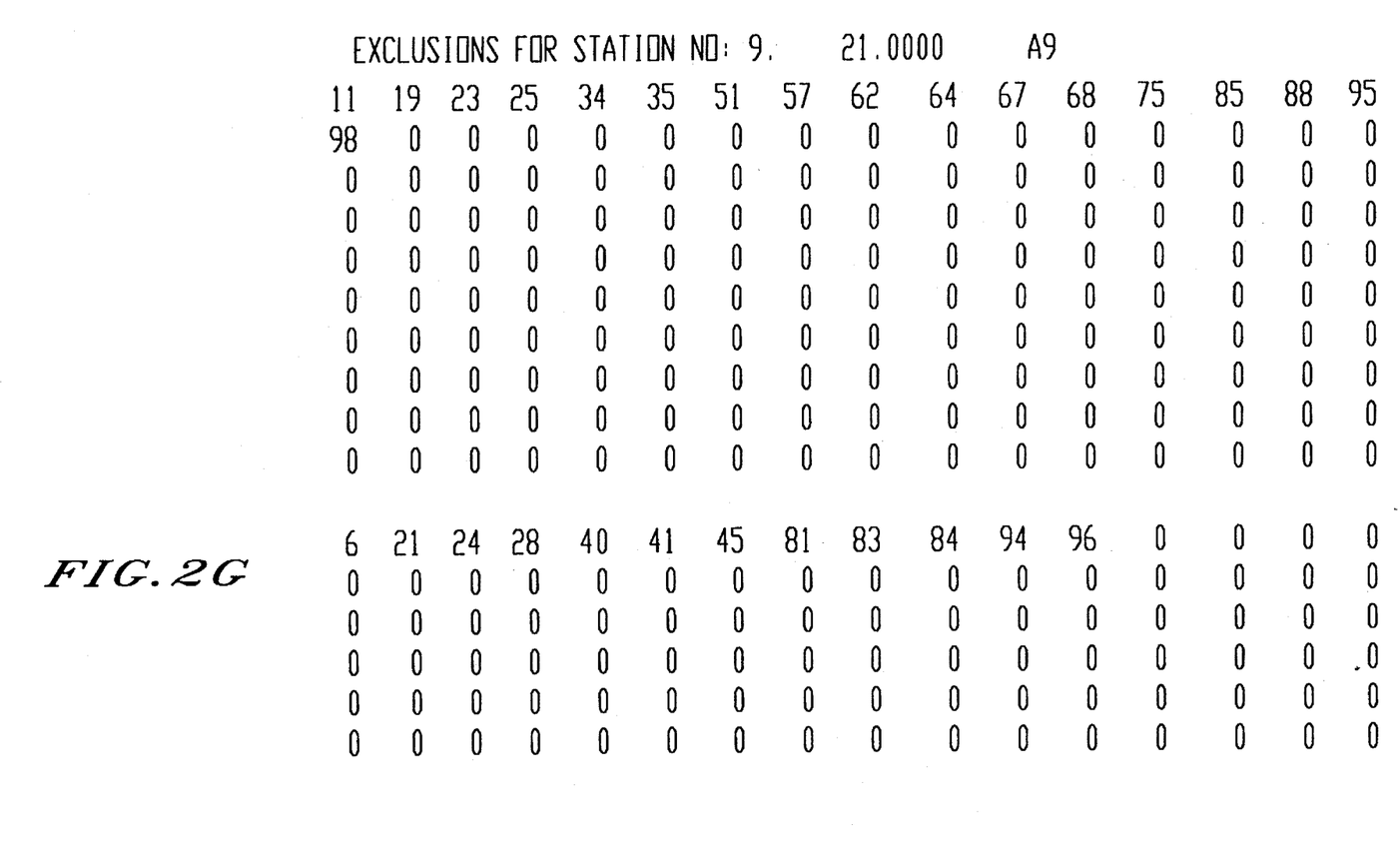
Figure 2H:
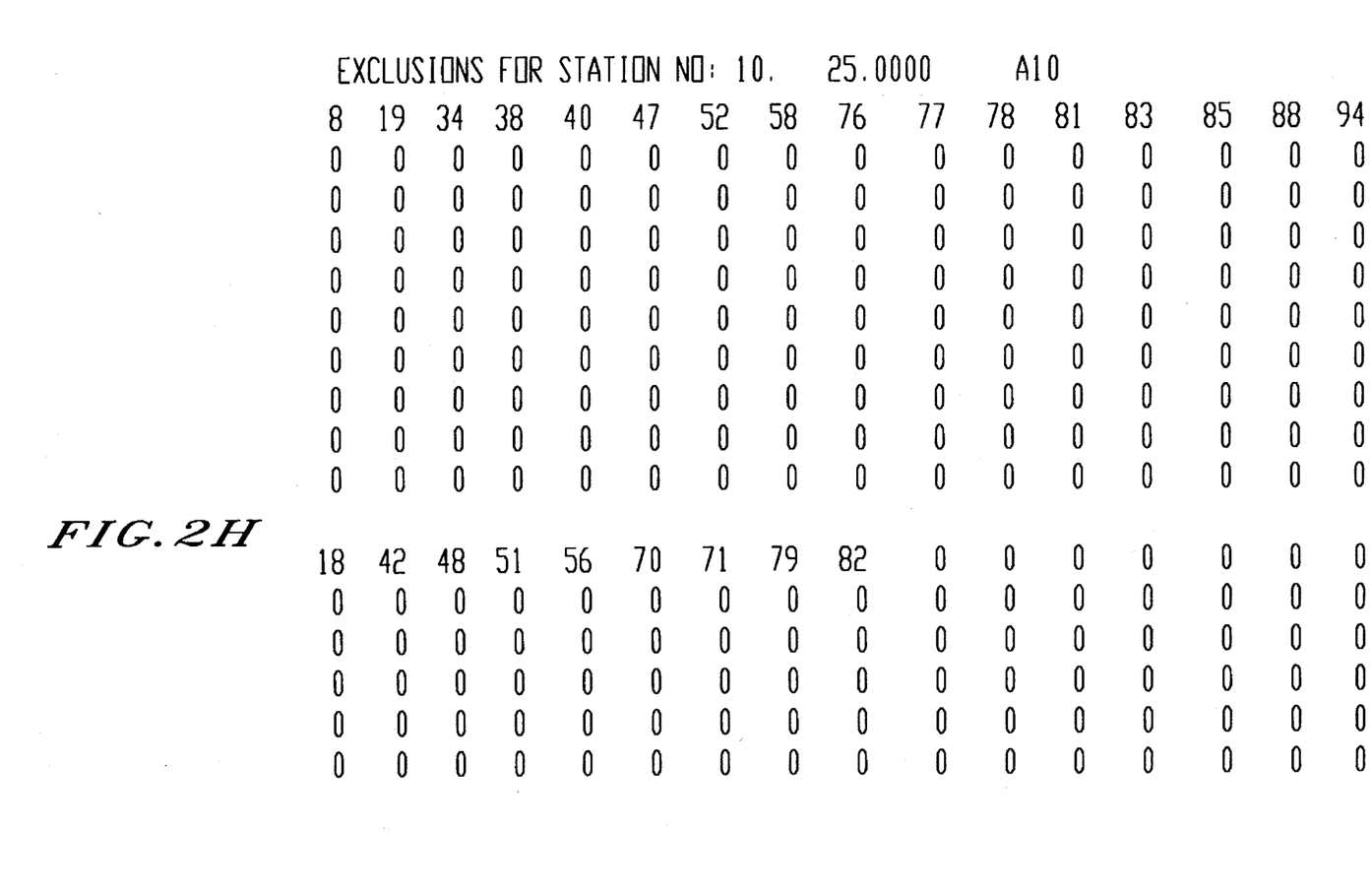

The current marginal list generated by the channel allocation of table 1 and exclusion matrix of table 2 is shown in table 3. It will happen that channel alternatives of a given element is presented being mutually exclusive, see e.g. possible channels for cell A 13, where channel 9 excludes both channel 28 and channel 29.

Therefore, if cell A 13 has channel 9 it can not be enlarged with further channels. If instead channel 28 is allocated to the cell also channel 29 can be added. For this reason the number of alternatives is not a direct expression of the geographical distribution of overall free capacity of the channel allocation. However, the list expresses the degree of free marginal capacity, i.e. the capacity of absorbing at least one further channel in an arbitrary cell. Through the following procedure it is possible to derive a distribution of the cells having the largest possible traffic handled by the system:

1. Begin with element 1 of the marginal list of table 3, if the corresponding cell has the highest priority with respect to capacity need, and note that one further channel can be accommodated in cell 1, meaning that the cell can have both channels 22 and 8. Thus, add an additional element to the exclusion matrix having the exclusions corresponding to cell A 1. The new elements of the exclusion matrix should be provided with cochannel exclusions with respect to the old element and, if necessary, which we assume here, neighbouring channel exclusions. If the new element relating to cell A 1 gets the serial number 2 it will be necessary to renumber all succeeding elements of the exclusion matrix and new versions of the lists in tables 1 to 3 have to be generated. In case no channel alternative exists of a selected cell the next cell in the order of priority is selected.

2. A new marginal list analogous with the list of table 3 is generated for the new channel plan and the new exclusion matrix. The procedure of generating the marginal list is described above.

3. The procedure according to 1 and 2 is repeated, now with a new cell from the new marginal list, said cell being selected with a high priority from a traffic point of view, which allows extension with one further channel.

4. The procedure 1 to 3 is repeated until there are no additional channels left at one's disposal or until there are only such cells left that do not require an extension of the capacity.

Figure 4:
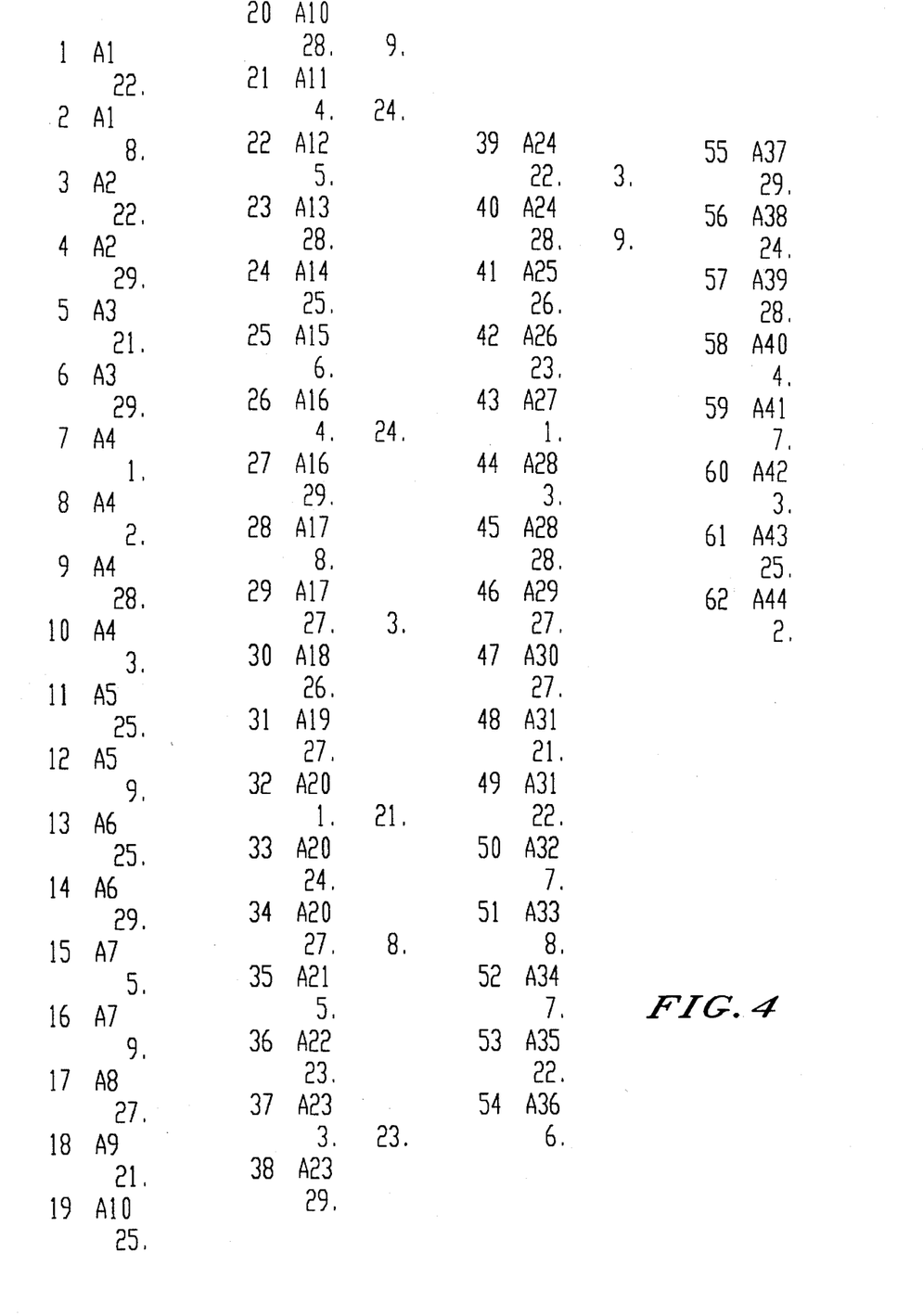
FIG. 4 is a table that shows marginal capacity in a channel plan developed with new channels per cell according to FIG. 1, see also FIG. 5, and an exclusion matrix according to FIG. 2 with additional inserted elements representing further channels for existing cells Am,m=1,2 . . . etc.
Figure 5:
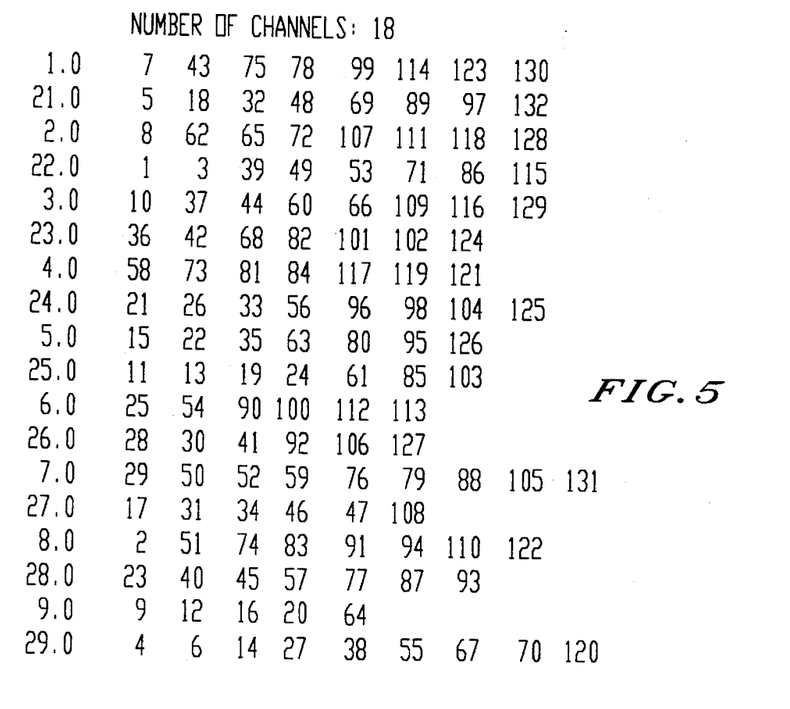
FIG. 5 is a table that shows the channel plan developed with new channels according to FIG. 1.
Figure 6:
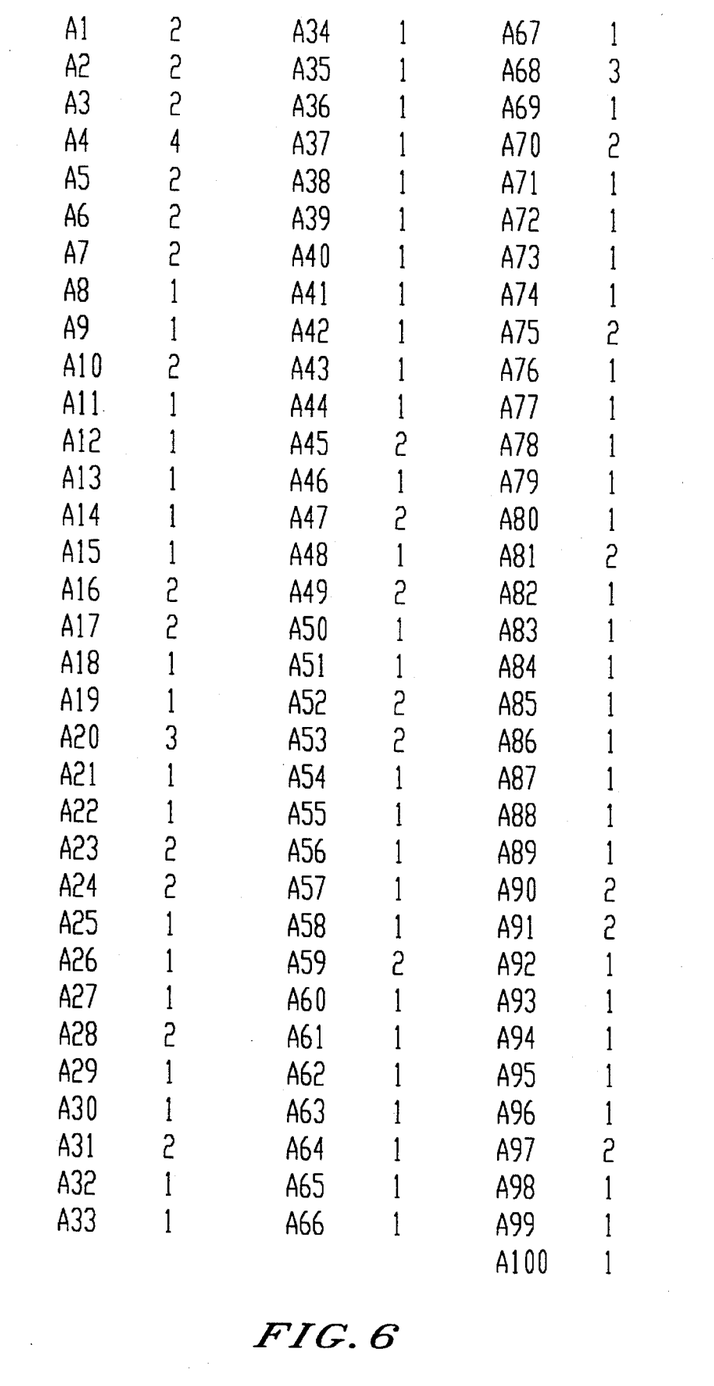
FIG. 6 is a table that shows the maximal capacity of the radio system in form of number of channels per cell in given orders of priority for cells and channels.
Figure 7:
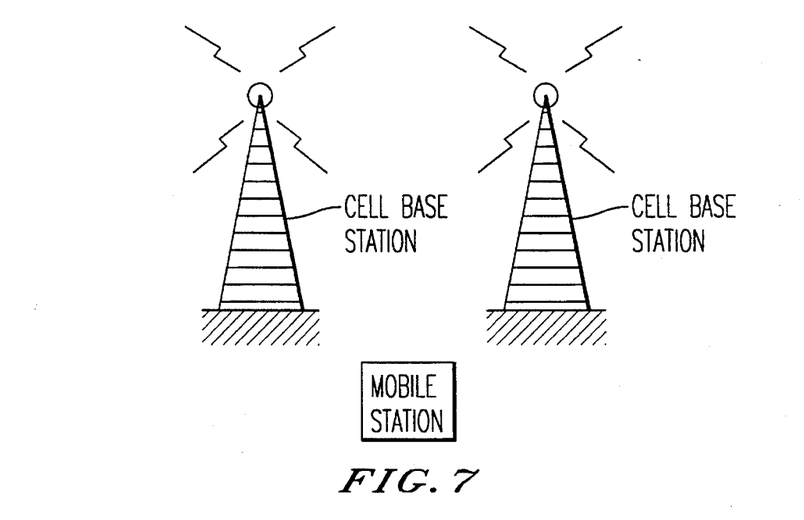
FIG. 7 is a pictorial representation of a cellular system according to this invention.

5. When the above procedure is finished the result is a marginal list reflecting the maximal capacity of the cell system for the special order of priority of cells and channels selected when extending the capacity of the cells in the series of marginal lists. Obviously, it is only desired to extend the capacity of the cells that have the heaviest load from a traffic point of view. Table 4 shows an example of a marginal list being result of the above procedure when it is completed until no further capacity remains. As may be seen, the alternatives represented are all mutually exclusive and cannot increase the capacity of the cell further. The resulting channel plan is shown in table 5 and the maximal capacity per cell is shown in table 6. The table shown in FIG. 4 shows the results of extending the capacity of the system according to Table 1 through 3 using the procedure set forth in the flow chart 8b and Table 5 becomes the corresponding "new" channel plan. As may be seen from Table 4 the new channels have been added (for example Elements numbers 1 and 2 relate to station A 1 with the channels 22 and 8 respectively. Table 6 shows the number of channels per station in accordance with Table 4.

In an already established mobile radio system the above method is used to redistribute the channels of the system. This is done by transferring information about the traffic need of the various parts of the radio system from the various radio stations to centrally provided means, e.g. a computer calculating a new order of priority with respect to the present traffic need. Idle channels, if any, thereafter are added in accordance with the above description to the cells requiring further capacity. If it is not possible to add a cell quite simply a redistribution between the cells can be achieved by taking a channel from a cell and transferring it to another cell. This means that the radio system continuously is optimized in response to the traffic need.

The present invention has a plurality of advantages as is appreciated by a skilled person. The invention is only limited by the claims below.

We claim:

1. An allocation method for creating channel plans in a cellular phone system said system having at least two base stations each having a geographic location and at least one mobile station therein said method comprising the steps of:

allocating at least one radio frequency channel for transmission by a given base station;

producing a matrix of values indicative of at least one radio channel frequency initially allocated for each base station;

producing a channel exclusion matrix for each base station of radio channels to be not used by a base station based upon the geographic location of said base station and the channels employed by each base station, the channels used by physically adjacent base stations and indicative of the physical relationship of each base station in the system to other base stations in the system;

dynamically altering said exclusion matrix based upon traffic need within said system to produce a dynamically altered exclusion matrix; and allocating for radio transmission various radio frequency channels for each base station in said system based upon said dynamically altered exclusion matrix.

2. A method as in claim 1 wherein:

said step of dynamically altering occurs on a repetitive basis.

3. A method as in claims 1 or 2 further comprising the steps of:

creating an initial marginal list of channel allocations for a given base station;

selecting a base station to transmit based upon a priority of channels allocated to the base stations in the system and the location of the mobile station to be contacted;

altering the exclusion matrix of all base stations in the system based upon the selection of said base station which is transmitting; and removing from the exclusion matrix of the selected base station any entry indicative of the selected channel upon which the communication is proceeding.

\* \* \* \* \*